US012645924B2

(12) United States Patent
Narayanaswami et al.

(10) Patent No.: US 12,645,924 B2
(45) Date of Patent: Jun. 2, 2026

(54) HARDWARE CIRCUIT FOR ACCELERATING NEURAL NETWORK COMPUTATIONS

(71) Applicant: Google LLC, Mountain View, CA (US)

(72) Inventors: Ravi Narayanaswami, San Jose, CA (US); Dong Hyuk Woo, San Jose, CA (US); Suyog Gupta, Sunnyvale, CA (US); Uday Kumar Dasari, Union City, CA (US)

(73) Assignee: Google LLC, Mountain View, CA (US)

( * ) Notice: Subject to any disclaimer, the term of this patent is extended or adjusted under 35 U.S.C. 154(b) by 1053 days.

(21) Appl. No.: 16/973,087

(22) PCT Filed: Dec. 19, 2019

(86) PCT No.: PCT/US2019/067648
§ 371 (c)(1),
(2) Date: Dec. 8, 2020

(87) PCT Pub. No.: WO2021/126225
PCT Pub. Date: Jun. 24, 2021

(65) Prior Publication Data
US 2021/0326683 A1     Oct. 21, 2021

(51) Int. Cl.
*G06N 3/063*      (2023.01)
*G06N 3/04*       (2023.01)

(52) U.S. Cl.
CPC .............. *G06N 3/063* (2013.01); *G06N 3/04* (2013.01)

(58) Field of Classification Search
CPC ................................. G06N 3/063; G06N 3/04
See application file for complete search history.

(56) References Cited

U.S. PATENT DOCUMENTS 9,269,123 B2    2/2016  Schneider
2018/0046900 A1*  2/2018  Dally .................... G06F 9/3001
(Continued)

FOREIGN PATENT DOCUMENTS

CN         109190758 A      1/2019
KR     10-2019-0066058      6/2019
(Continued)

OTHER PUBLICATIONS

Cadambi et al., "A Programmable Parallel Accelerator for Learning and Classification," PACT '10, Sep. 11-15, 2010, pp. 273-283. (Year: 2010).*
(Continued)

*Primary Examiner* — Kyle R Stork
(74) *Attorney, Agent, or Firm* — Fish & Richardson P.C.

(57)                ABSTRACT

Methods, systems, and apparatus, including computer-readable media, are described for a hardware circuit configured to implement a neural network. The circuit includes multiple super tiles. Each super tile includes a unified memory for storing inputs to a neural network layer and weights for the layer. Each super tile includes multiple compute tiles. Each compute tile executes a compute thread that is used to perform the computations to generate an output for the neural network layer. Each super tile includes arbitration logic coupled to the unified memory and each compute tile. The arbitration logic is configured to: pass inputs stored in the unified memory to the compute tiles; pass weights stored in the unified memory to the compute tiles; and pass, to the unified memory, the output generated for the layer based on computations performed at the compute tiles using the inputs and the weights for the layer.

26 Claims, 5 Drawing Sheets

(56)                References Cited

U.S. PATENT DOCUMENTS

| | | | | |
|---|---|---|---|---|
| 2018/0285254 | A1 | 10/2018 | Baum et al. | |
| 2019/0205746 | A1 | 7/2019 | Nurvitadhi et al. | |
| 2019/0220742 | A1* | 7/2019 | Kuo | G06N 3/048 |
| 2019/0370631 | A1* | 12/2019 | Fais | G06N 3/105 |
| 2020/0192720 | A1* | 6/2020 | Liu | G06F 9/52 |
| 2020/0409664 | A1* | 12/2020 | Li | G06F 9/3836 |
| 2021/0125042 | A1* | 4/2021 | Han | G06N 3/063 |

FOREIGN PATENT DOCUMENTS

| | | |
|---|---|---|
| TW | 201911140 A | 3/2019 |
| WO | WO 2019/212688 | 11/2019 |

OTHER PUBLICATIONS

Song et al., "HyPar: Towards Hybrid Parallelism for Deep Learning Accelerator Array," 2019 IEEE International Symposium on High Performance Computer Architecture (HPCA), 2019, pp. 56-68. (Year: 2019).*

Shao et al., "Simba: Scaling Deep-Learning Inference with Multi-Chip-Module-Based Architecture," Micro-52, Oct. 12-16, 2019, pp. 14-27. (Year: 2019).*

Shao et al. (Year: 2019).*

Cadambi et al. (Year: 2010).*

Song et al. (Year: 2019).*

Lasalle et al., "A Scalable Tile-Based Framework for Region-Merging Segmentation," May 4, 2015, IEEE Transactions on Geoscience and Remote Sensing (vol. 53, Issue: 10, Oct. 2015), pp. 5473-5485. (Year: 2015).*

Wang et al. "A Unified Tensor Level Set for Image Segmentation," Nov. 3, 2009, IEEE Transactions on Systems, Man, and Cybernetics, Part B (Cybernetics) (vol. 40, Issue: 3, Jun. 2010), pp. 857-867. (Year: 2009).*

Office Action in Japanese Appln. No. 2022-517255, mailed on Sep. 26, 2023, 7 pages (with English translation).

International Preliminary Report on Patentability in International Appln. No. PCT/US2019/067648, dated Jun. 30, 2022, 9 pages.

Duran et al., "A many core implementation of the direct n body problem," High Performance Parallelism Pearls, Nov. 2017, 16 pages.

Lan et al., "High performance implementation of 3d convolutional neural networks on a gpu," Computational intelligence and neuroscience, Nov. 2017, 9 pages.

PCT International Search Report and Written Opinion in International Appln. No. PCT/US2019/067648, dated Oct. 6, 2020, 14 pages.

Notice of Allowance in Japanese Appln. No. 2022-517255, dated Jun. 18, 2024, 5 pages (with English translation).

Office Action in Korean Appln. No. 10-2022-7008209, dated Jun. 17, 2024, 17 pages (with English translation).

Office Action in European Appln. No. 19842493.9, mailed on Jul. 8, 2024, 7 pages.

Office Action in Taiwanese Appln. No. 11321015770, mailed on Oct. 7, 2024, 26 pages (with machine translation).

Office Action in Chinese Appln. No. 201980100413.8, mailed on Dec. 20, 2024, 16 pages (with English translation).

Office Action in Korean Appln. No. 10-2022-7008209, dated Feb. 4, 2025, 7 pages (with English translation).

Office Action in European Appln. No. 19842493.9, mailed on May 30, 2025, 9 pages.

Office Action in Japanese Appln. No. 2024-114737, mailed on Jul. 22, 2025, 5 pages (with English translation).

Notice of Allowance in Korean Appln. No. 10-2022-7008209, mailed on Sep. 29, 2025, 4 pages (with English translation).

Office Action in Korean Appln. No. 10-2022-7008209, mailed on Feb. 4, 2025, 6 pages (with English translation).

* cited by examiner

```
for x in range (1, X):
    for y in range (1, Y):
        for kx in range (1, kx):
            for ky in range (1, ky):
                for zi in range (1, zin):
                    for zo in range (1, zout):
                        output[x][y][zo] += input[x+kx][y+ky][zi] *
filter[kx][ky][zi][zo]
```

Loop Nest for a Super Tile

400

| Operation | Instruction Parameter/Field |
|---|---|
| TensorOp | "thread_multicast_bitmap_Tn_Op" |
| NarrowToWide DMA | "thread_multicast_bitmap_N_to_W" |
| RingBusConsumer DMA | "thread_multicast_bitmap_RB_Consmr" |
| LoadCoefficientTables | "thread_multicast_bitmap_Ld_Coeff" |
| SyncFlag | "thread_id" |
| SyncWatcher | "wait_on_self_thread_id"<br>"thread_id" |
| TileFence | "reset_sync_flag_thread_ids"<br>"wait_idle_thread_ids" |

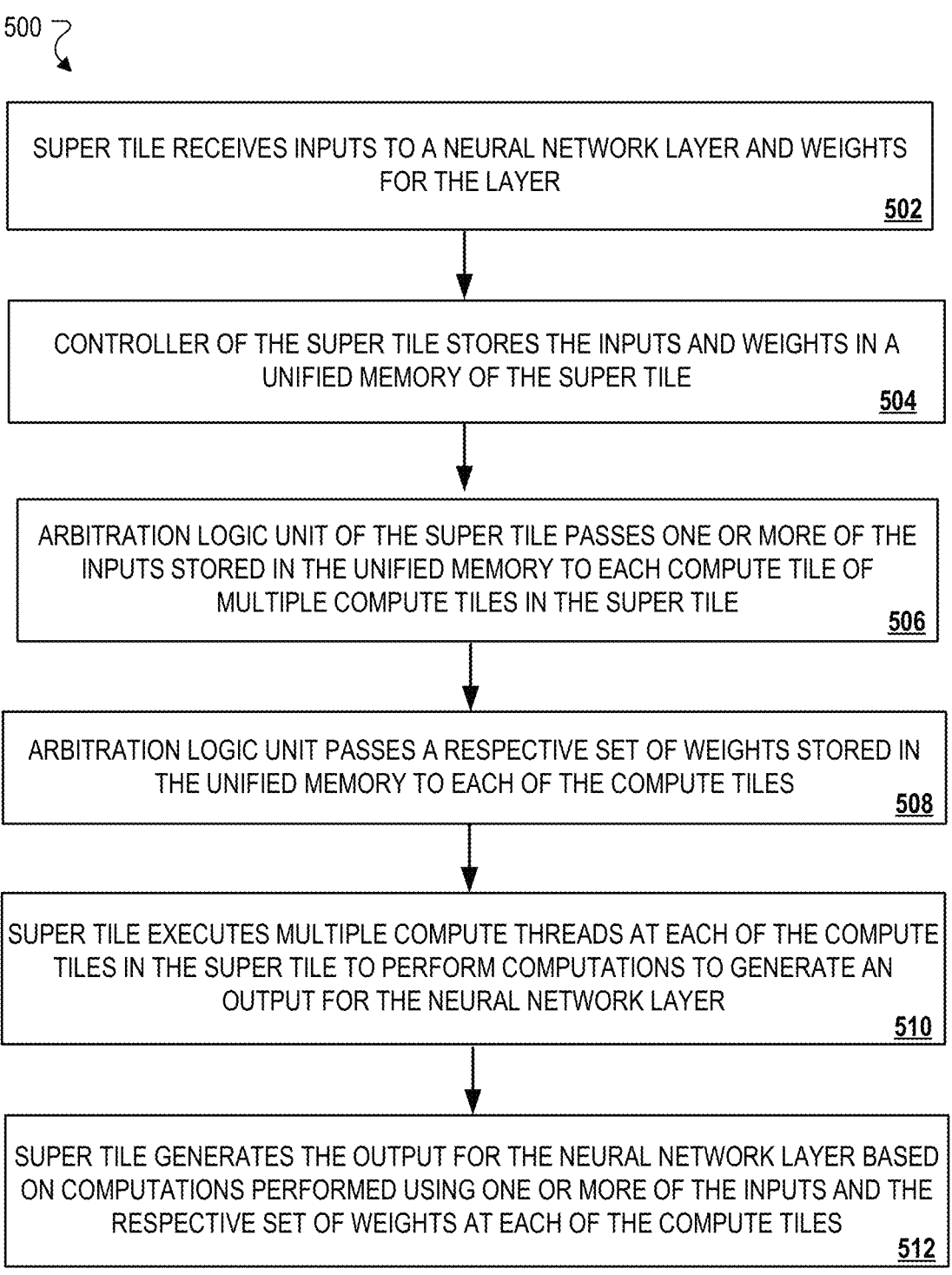

SUPER TILE RECEIVES INPUTS TO A NEURAL NETWORK LAYER AND WEIGHTS
FOR THE LAYER

502

CONTROLLER OF THE SUPER TILE STORES THE INPUTS AND WEIGHTS IN A
UNIFIED MEMORY OF THE SUPER TILE

504

ARBITRATION LOGIC UNIT OF THE SUPER TILE PASSES ONE OR MORE OF THE
INPUTS STORED IN THE UNIFIED MEMORY TO EACH COMPUTE TILE OF
MULTIPLE COMPUTE TILES IN THE SUPER TILE

506

ARBITRATION LOGIC UNIT PASSES A RESPECTIVE SET OF WEIGHTS STORED IN
THE UNIFIED MEMORY TO EACH OF THE COMPUTE TILES

508

SUPER TILE EXECUTES MULTIPLE COMPUTE THREADS AT EACH OF THE COMPUTE
TILES IN THE SUPER TILE TO PERFORM COMPUTATIONS TO GENERATE AN
OUTPUT FOR THE NEURAL NETWORK LAYER

510

SUPER TILE GENERATES THE OUTPUT FOR THE NEURAL NETWORK LAYER BASED
ON COMPUTATIONS PERFORMED USING ONE OR MORE OF THE INPUTS AND THE
RESPECTIVE SET OF WEIGHTS AT EACH OF THE COMPUTE TILES

HARDWARE CIRCUIT FOR ACCELERATING NEURAL NETWORK COMPUTATIONS

BACKGROUND

This specification generally relates to circuitry for a hardware accelerator used to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters. Some neural networks are convolutional neural networks (CNNs) (e.g., used for image processing) or recurrent neural networks (RNNs) (e.g., used for speech and language processing).

CNNs and RNNs are neural networks that include respective sets of convolutional or recurrent neural network layers. A neural network layer can have an associated set of kernels, which may correspond to parameters or weights, which are used to process inputs through the layer to generate a corresponding output of the layer for computing a neural network inference. Kernels can be represented as a tensor, i.e., a multi-dimensional array, of weights. As an example, a neural network layer in a sequence of layers can process a set of inputs, such as inputs of image pixel data or activation values generated by another neural network layer in the sequence of layers. The set of inputs or set of activation values can also be represented as a tensor.

SUMMARY

This document describes an improved hardware circuit that can be used in a hardware accelerator configured to accelerate computations of an example neural network model, such as computations of a layer of an artificial neural network. The circuit architecture includes multiple super tiles, where each super tile is configured to execute multiple compute threads based on data obtained from a unified memory of the super tile. The unified memory provides a memory construct that can be shared efficiently between each of the compute threads such that computations for each of the compute threads can be executed concurrently at the super tile.

In some implementations, the described hardware circuit and processing techniques can be used in an example computing system, such as a small-scale or large-scale distributed system, that includes circuitry for multiple special-purpose processors (e.g., hardware accelerators) that are used to perform inference (or training) computations of an example machine-learning workload. The circuit architecture described herein can be integrated in each of the multiple special-purpose processors to enhance the speed and efficiency with which the processors perform computations for executing task for various types of machine-learning models.

One aspect of the subject matter described in this specification can be embodied in a circuit for a hardware accelerator configured to implement a neural network that includes multiple neural network layers and to perform computations to generate an output for a neural network layer. The circuit includes: multiple super tiles, each super tile of the multiple super tiles includes: a unified memory configured to store inputs to the neural network layer and multiple weights for the neural network layer; multiple compute tiles, where each compute tile is configured to execute a compute thread used to perform the computations to generate the output; and an arbitration logic unit coupled to the unified memory and each of the multiple compute tiles. The arbitration logic unit is configured to: pass one or more of the inputs stored in the unified memory to each of the compute tiles; pass a respective set of weights stored in the unified memory to each of the compute tiles; and pass, to the unified memory, the output generated for the neural network layer based on computations performed at each of the compute tiles using one or more of the inputs and the respective set of weights.

These and other implementations can each optionally include one or more of the following features. For example, in some implementations, the circuit includes a respective controller for each super tile, the respective controller being configured to generate one or more control signals that are used to: store each of the inputs to the neural network layer in a corresponding location of the unified memory, each of the corresponding locations being identified by a respective address; store each weight of the multiple weights for the neural network layer in a corresponding location of the unified memory, each of the corresponding locations being identified by a respective address; and cause the arbitration logic to pass one or more inputs to a compute cell of a particular compute tile and pass a respective set of weights to the particular compute tile.

In some implementations, the controller is configured to: store the respective set of weights for the particular compute tile in a respective register file of the particular compute tile that is local to the particular compute tile. In some implementations, the controller is configured to: determine a partitioning of addresses in the unified memory for storing respective batches of inputs to be passed to a corresponding compute tile of a super tile, wherein each partition of addresses is assigned to a respective compute tile of the super tile.

In some implementations, a respective address in a partition of addresses corresponds to an input in a batch of inputs that form a sample of input features; the sample of input features includes multiple sets of input features; and the sets of input features correspond to images or streams of audio data. In some implementations, the arbitration logic unit is configured to: obtain, for a first partition of addresses, a first batch of inputs from memory locations identified by addresses in the partition of addresses; and pass the first batch of inputs to cells of a first compute tile, wherein the first compute tile is assigned to receive each input in the first batch of inputs based on the determined partitioning of addresses in the unified memory.

In some implementations, for each respective super tile: each compute tile of the multiple compute tiles is configured to execute two or more compute threads in parallel at the compute tile; and each compute tile executes a compute thread to perform multiplications between one or more inputs to the neural network layer and a weight for the neural network layer to generate a partial output for the neural network layer.

In some implementations, for each respective super tile: each compute tile of the multiple compute tiles is configured to perform a portion of the computations to generate the output for the neural network layer in response to executing the two or more compute threads in parallel at the compute tile; and in response to performing the portion of the computations, generate one or more partial outputs that are used to generate the output for the neural network layer.

In some implementations, the circuit is configured to, for each respective compute tile of the multiple compute tiles in a super tile: execute two or more compute threads in parallel at the compute tile. And, for each respective super tile of the multiple super tiles: the circuit is configured to execute, in parallel, two or more threads that are assigned to each compute tile to generate the output for the neural network layer. In some implementations, a first portion of operations that are performed using the compute thread corresponds to a first set of tensor operations for traversing one or more dimensions of a first multi-dimensional tensor; and the first multi-dimensional tensor is an input tensor including data elements corresponding to the inputs stored in the unified memory.

In some implementations, a second portion of operations that are performed using the compute thread corresponds to a second set of tensor operations for traversing one or more dimensions of a second multi-dimensional tensor that is different than the first multi-dimensional tensor; and the second multi-dimensional tensor is a weight tensor including data elements corresponding to the multiple weights stored in the unified memory.

One aspect of the subject matter described in this specification can be embodied in a method for performing computations to generate an output for a neural network layer of a neural network that includes multiple neural network layers using a circuit for a hardware accelerator configured to implement the neural network. The method includes: receiving, at a super tile of multiple super tiles, inputs to the neural network layer and multiple weights for the neural network layer; and storing, in a unified memory of the super tile, the inputs to the neural network layer and the multiple weights for the neural network layer. The method also includes passing, using an arbitration logic unit of the super tile, one or more of the inputs stored in the unified memory to each compute tile of multiple compute tiles in the super tile, where the arbitration logic unit is coupled to the unified memory and each compute tile of the multiple compute tiles; and passing, using the arbitration logic unit of the super tile, a respective set of weights stored in the unified memory to each of the compute tiles. The method includes executing a compute thread at each of the compute tiles in the super tile to perform the computations to generate the output for the neural network layer; and generating the output for the neural network layer based on computations performed using one or more of the inputs and the respective set of weights at each of the compute tiles.

These and other implementations can each optionally include one or more of the following features. For example, in some implementations, the method includes: passing, using the arbitration logic unit and to the unified memory, the output generated for the neural network layer; and passing, using a respective controller of the super tile, the output generated for the neural network layer to another super tile at the circuit.

In some implementations, the method includes: generating control signals by the respective controller of the super tile; storing, based on the control signals, each of the inputs to the neural network layer in a corresponding location of the unified memory, each of the corresponding locations being identified by a respective address; storing, based on the control signals, each weight of the multiple weights for the neural network layer in a corresponding location of the unified memory, each of the corresponding locations being identified by a respective address; and causing, based on the control signals, the arbitration logic to pass one or more inputs to a compute cell of a particular compute tile and pass a respective set of weights to the particular compute tile.

In some implementations, the method includes, for each respective super tile: executing each compute thread of two or more compute threads in parallel at each compute tile of the multiple compute tiles; and wherein each compute tile executes a compute thread to perform multiplications between one or more inputs to the neural network layer and a weight for the neural network layer to generate a partial output for the neural network layer.

One aspect of the subject matter described in this specification can be embodied in a system-on-chip (SoC). The SoC includes a circuit for a hardware accelerator configured to implement a neural network comprising a plurality of neural network layers and to perform computations to generate an output for a neural network layer; a host controller configured to access memory that is external to the circuit for the hardware accelerator, wherein the memory is configured to store data for processing at the neural network layer; and a host interface configured to exchange data communications between the circuit for the hardware accelerator and the host controller.

The SoC includes multiple super tiles disposed in the circuit. Each super tile of the multiple super tiles includes: a unified memory configured to store inputs to the neural network layer and multiple weights for the neural network layer. The inputs and the multiple weights correspond to the data stored in the memory accessible by the host controller. Each super tile includes multiple compute tiles, where each compute tile is configured to execute a compute thread used to perform the computations to generate the output. Each super tile includes an arbitration logic unit coupled to the unified memory and each compute tile of the plurality of compute tiles.

The arbitration logic unit is configured to: pass one or more of the inputs stored in the unified memory to each of the compute tiles; pass a respective set of weights stored in the unified memory to each of the compute tiles; and pass, to the unified memory, the output generated for the neural network layer based on computations performed at each of the compute tiles using one or more of the inputs and the respective set of weights.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The circuit architecture and data processing techniques described in this specification can be integrated in an example distributed system to reduce the processing time required to process a set of inputs through a layer of a neural network, such as a convolutional or recurrent neural network.

The circuit architecture and data processing techniques provide different combinations of approaches for optimizing how computations are parallelized across tiles, relative to prior circuit designs for performing neural network computations. For example, the described techniques allow for optimizing how computations are parallelized across tiles for use cases with significant re-use of data between computations, such as when activations are re-used across different dimensions of a filter and parameters are re-used across multiple activations in a batch.

The techniques can be used to implement a circuit architecture and software stack providing one or more super tiles that allow for multiple concurrent compute threads within the super tile. The architecture allows for processing techniques that include determining whether to broadcast and/or slice both parameters (weights) and activations. This determination can be different for different types of workloads in order to optimize the performance of an example hardware accelerator that incorporates the architecture.

The optimizations can be tied to the utilization rate of multiply accumulate cells in a computational unit of the hardware circuit. The utilization rate may be assessed with reference to the different approaches for partitioning dimensions of a tensor across the super tiles based on the improved circuit architecture, e.g., partitioning across a Z-dimension of a tensor across the 4 super tiles, or partitioning X,Y dimensions of a tensor across 2 super tiles. For example, using the techniques described in this document, multiple approaches may be used to parallelize computations across tiles, such that the multiply accumulate cells of the circuit can achieve a threshold utilization rate (e.g., 70%) that is higher than a utilization rate of cells in a prior circuit design.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 illustrates a table that includes example instructions of an instruction set architecture for one or more super tiles.

FIG. 5 is a flow diagram that illustrates an example process for accelerating neural network computations.

Like reference numbers and designations in the various drawings indicate like elements.

DETAILED DESCRIPTION

This specification describes an improved hardware circuit as well as data processing techniques that can be implemented using the architecture of the improved hardware circuit. The hardware circuit can be special-purpose processor, such as a neural network processor, an application specific integrated circuit, or hardware accelerator.

The hardware circuit includes multiple super tiles. Each super tile includes a unified memory for storing inputs to a neural network layer and weights for the layer. Each super tile is configured to execute multiple compute threads based on data obtained from a unified memory of the super tile and instructions received at the super tile via a communication bus that is coupled to each of the super tiles. In some implementations, each super tile includes multiple compute tiles, where each compute tile is configured to execute one or more compute threads. In some cases, each compute tile is configured to execute one compute thread such that the super tile can execute multiple compute threads in parallel. In other cases, each compute tile can be configured to execute multiple compute threads such that the super tile executes each of the multiple compute threads in parallel. The compute threads are used to perform the computations to generate an output for a neural network layer.

Each super tile includes an arbitration logic unit that is coupled to the unified memory and to each compute tile or each compute thread that may be executed at the super tile. The arbitration logic unit is configured to pass, to the compute tiles, inputs and weights that are stored in the unified memory. The arbitration logic unit is also configured to pass the output generated for the layer to the unified memory of a super tile that is assigned to receive the output or to each of the one or more super tiles that are assigned to receive a portion of the output.

In some implementations, an output for the neural network layer is generated at a super tile based on computations performed at the compute tiles of the super tile using the inputs and the weights for the layer that are passed to the compute tiles by the arbitration logic unit. In other implementations, one or more layers of a neural network may be split across multiple super tiles, e.g., the layer may be parallelized across multiple super tiles such that each super tile performs part of the processing for the layer. In these implementations, an output for the neural network layer is generated across the multiple super tiles as respective sets of output values (e.g., vectors of activation values) that together form the output for the neural network layer.

Figure 1:
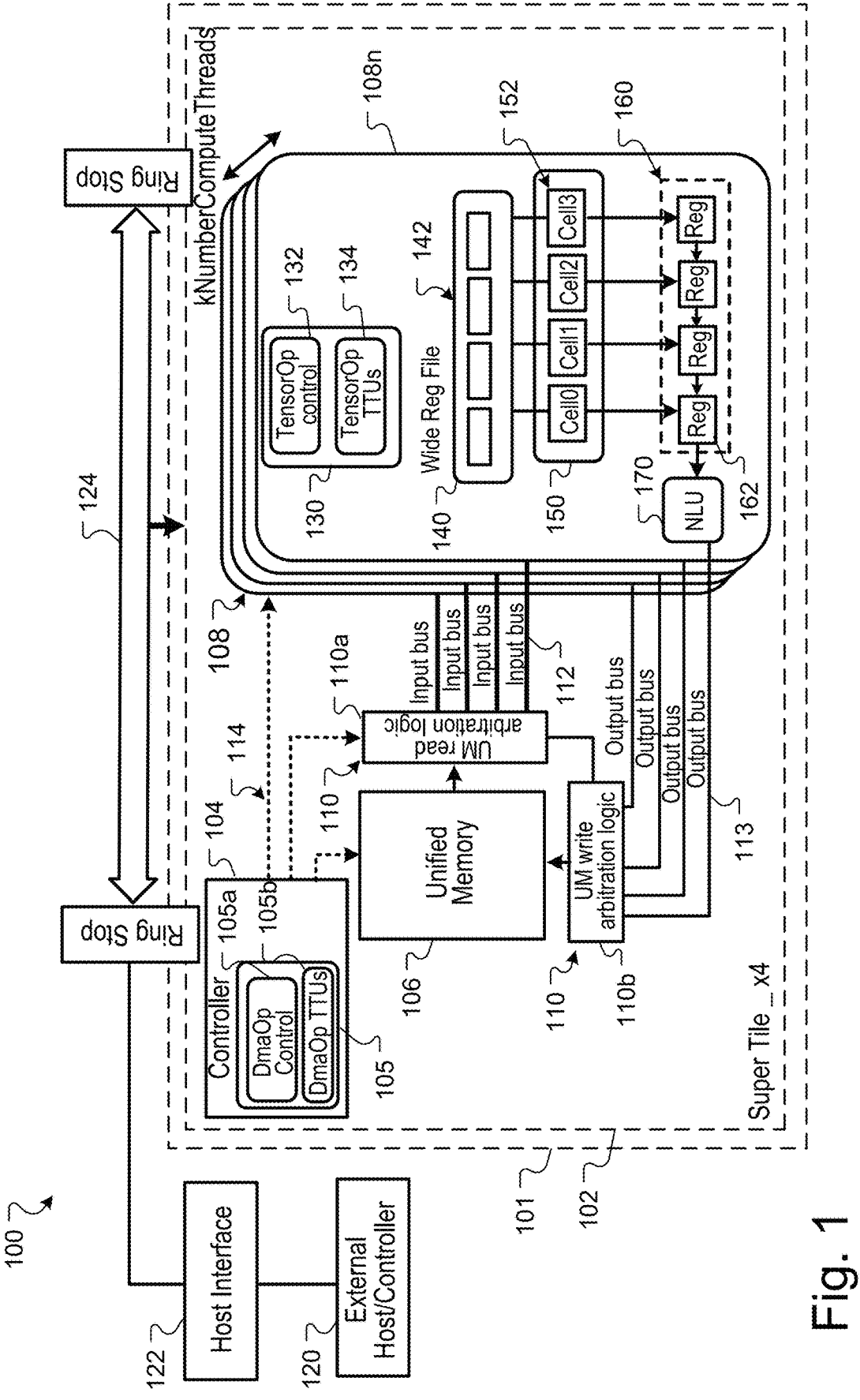
FIG. 1 is a block diagram of a computing system that includes an example circuit for a hardware accelerator.

FIG. 1 is a block diagram of a computing system 100 that includes an example circuit for a hardware accelerator. In some cases, the system 100 is an example computing system for accelerating tensor or neural network computations associated with artificial deep neural networks (DNNs), such as RNNs or CNNs. For instance, system 100 is configured to implement an example artificial neural network (e.g., a CNN) on a hardware circuit 101, such as a special-purpose hardware circuit. In some implementations, system 100 is a system-on-chip. For example, the system-on-chip can include hardware circuit 101 and some (or all) of the other components and devices that are described in this document as being included in system 100.

The hardware circuit 101 may be a hardware accelerator configured to accelerate execution and/or performance of a neural network model. For example, execution of the neural network model may be accelerated relative to execution of the model on an example general-purpose machine, such as a central processing unit (CPU). Similarly, performance and execution of the neural network model may be accelerated relative to when the model is implemented on another hardware accelerator (e.g., a graphics processing unit (GPU)) that does not have the improved hardware features and software functions associated with the techniques described in this specification.

The system 100, including the example circuit 101, can include one or more super tiles 102. In some implementations, the system 100 includes multiple super tiles 102. In the example of FIG. 1 (and FIG. 2 described below), system 100 is shown as including four super tiles 102, however system 100, as well as the hardware circuit 101 described herein, may include more or fewer super tiles. As described in more detail below, a super tile 102 is a discrete, self-contained computing unit of the system 100 (or hardware circuit 101). In some implementations, each super tile 102 is configured to independently execute computations (e.g., neural network computations) required by one or more layers of a multi-layer neural network.

The computations may be required to process data for a machine-learning workload or to execute specific tasks of the workload. In some implementations, a computation process performed within a super tile 102 for one or more neural network layers may include a multiplication of data values (e.g., inputs or activations) stored at respective elements of an input tensor with data values (e.g., weights) stored at respective elements of a parameter tensor. For example, the computation can include multiplying an input or activation value with a weight value on one or more cycles and performing an accumulation of a products over many cycles.

Each super tile 102 generally includes a respective controller 104, a respective a unified memory 106, a respective multiple compute tiles (or threads) 108, and a respective arbitration logic unit 110 ("arbitration logic 110").

The controller 104 is configured to generate control signals 114 for controlling operations that occur within a super tile 102. For example, the control signals 114 can be used to: a) store each of the received inputs to a neural network layer in a corresponding location of the unified memory 106 and b) store each of the received weights for a neural network layer in a corresponding location of the unified memory 106. Each of the corresponding memory locations that store a respective input or weight is identified by a respective address.

The controller 104 includes a direct memory access (DMA) module 105 that includes a DMA operation ("DMAOp") control 105a and a DMAOp tensor traversal unit (TTU) 105b. The DMAOp control 105a represents control logic that can be used by controller 104 to: i) manage writing/storing the data for the computations to memory locations of unified memory 106 and ii) manage reading/obtaining the data for the computations from memory locations of unified memory 106. For example, the DMAOp control 105a is executed by controller 104 to manage writing inputs of an input tensor received at super tile 102 to memory locations of unified memory 106 and weights of a weight tensor received at super tile 102 to memory locations of unified memory 106.

The DMAOp control 105a is operable to administer traversal operations for execution by DMAOp TTU 105b. In some implementations, a location or address of the unified memory 106 that a particular input or activation will be written to, or read from, is generated by the DMAOp TTU 105b based on inbound/outbound DMAOp instructions received via communication bus 124 (described below). For example, the DMAOp instructions may be processed by DMAOp control 105a to administer traversal operations that are executed by DMAOp TTU 105b to generate the location or addresses of unified memory 106 used to store the inputs and weights received via communication bus 124.

In some cases, inbound DMAOps and outbound DMAOps may be executed concurrently. An example outbound DMAOp can include the super tile 102 providing activation values of a generated layer output to a neighboring super tile 102 of system 100. During concurrent execution of inbound and outbound DMAOps, any required synchronization or arbitration of memory location access can be managed through sync flag control schemes administered by controller 104. In some implementations, the controller 104 is operable to administer the sync flag control schemes in conjunction with arbitration logic 110.

The control signals 114 generated by controller 104 can also be used to: a) cause the read arbitration logic 110a to pass one or more inputs obtained from the unified memory 106 to an arithmetic cell 152 (described below) of a particular compute tile 108n and b) cause the read arbitration logic 110a to pass a respective set of weights obtained from the unified memory 106 to the particular compute tile 108n. In some implementations, the arbitration logic 110 passes the inputs and weights to a compute tile 108n via an input bus 112.

As shown in the example of FIG. 1, the arbitration logic 110 may be coupled to each compute tile 108n of super tile 102 via a respective input bus 112 and a respective output bus 113. The arbitration logic 110 is configured to retrieve (or read) multiple batches of inputs from memory locations of unified memory 106. The arbitration logic 110 is also configured to store (or write) multiple sets of outputs or output activations provided by each compute tile 108 to memory locations of unified memory 106.

In some examples, the unified memory 106 may be described as a narrow memory structure that is operable to store inputs, activations, or gain values to be processed at a neural network layer, and output activations generated by a neural network layer in response to processing inputs or activations through the layer. The generating and storing of output activations are described in more detail. The unified memory 106 of each super tile 102 may employ a memory hierarchy that provides addressing arbitration and flexibility that allows for traversing a multi-dimensional array in any order, while also avoiding bank conflict for certain memory operations, such as single cycle read and write operations. In some implementations, the unified memory 106 includes multiple memory banks (e.g., multiple independently arbitrated memory banks) and arbitration logic 110 is configured to arbitrate read access and write access to each memory location of each memory bank in the unified memory 106.

Each batch of inputs that is passed by the arbitration logic 110 can correspond to a particular compute tile 108n, such that the batch of inputs is provided to the particular compute tile 108n via the respective input bus 112 that couples the particular compute tile 108n to the arbitration logic 110. For example, the arbitration logic 110 is configured to load each input in a first batch of inputs unto a first input bus 112 that couples the arbitration logic 110 to a first compute tile 108n at the super tile. The arbitration logic 110 is also configured to load each input in a second, different batch of inputs unto a second, different input bus 112 that couples the arbitration logic 110 to a second, different compute tile 108n at the super tile 102. Alternatively, in some cases each of the multiple batches of inputs may correspond to, and be loaded at, the same compute tile 108n.

The arbitration logic 110 is a logical unit or structure of unified memory 106. For example, the arbitration logic 110 can be a special-purpose memory arbiter used in a shared memory system (e.g., unified memory 106) to decide, for each memory cycle, which control device (e.g., DMAOp control 105a or TensorOp control 132) will be allowed to access shared memory resources of unified memory 106. For example, at super tile 102 the different instruction types of DMAOp control 105a and TensorOp control 132 can be configured as independent control threads that request for memory access, where the requests need to be arbitrated by arbitration logic 110.

As described herein, each super tile 102 is configured to execute k number of compute threads, where k is an integer that is equal to or greater than one. In some implementations, each of the k number of compute threads are software constructs executed at a respective super tile 102, where portions of the k number of compute threads may be managed or executed by a respective compute tile 108*n* of the super tile 102. A super tile 102 may be a superscalar tile or a supervector tile that represents an independent computing unit in which multiple TensorOp pipelines (or threads) execute in parallel, i.e., concurrently. For example, a parameter or variable kNumberComputeThreads can represent the number of parallel TensorOp pipelines in a superscalar tile 102 or a supervector tile 102. A superscalar tile 102 can be an example super tile 102 that operates on scalar input values, whereas a supervector tile 102 can be an example super tile 102 that operates on vectors of input values.

In a super tile 102, each compute thread can correspond to a single compute tile, where a compute tile executes a single compute thread. Alternatively, each compute tile can be configured to execute multiple compute threads. In some implementations, sets of compute tiles 108*n* may be physically or logically arranged in the respective super tiles 102 of system 100. For example, in system 100 (or hardware circuit 101), the sets of compute tiles 108*n* for a respective super tile 102 may be arranged in hardware or software. In some implementations, when compute tiles 108*n* for a respective super tile 102 are arranged in software, the super tile 102 can be configured to execute n number of compute tiles 108, where n is an integer that is equal to or greater than one. In these implementations, each of then number compute tiles 108*n* can be configured to execute k number of compute threads.

The control signals 114 generated by controller 104 can also be used to: a) cause the write arbitration logic 110*b* to pass activations of a generated layer output to the unified memory 106 for storing in the memory 106 and b) cause the super tile 102 to provide activation values of the generated layer output to a neighboring super tile.

System 100 includes an external host/controller 120 that is coupled to each of the super tiles 102 via a host interface 122. In some implementations, the host interface 122 is coupled between the host controller 120 and a circuit for a hardware accelerator (e.g., hardware circuit 101) that may be included in a system-on-chip. The host interface 122 is configured to exchange data communications between the host controller 120 and the circuit for the hardware accelerator. In some implementations, the host controller 120 is configured to access memory (e.g., external memory) that is external to the circuit for the hardware accelerator. The external memory is configured to store data for processing at a neural network implemented at the circuit. For example, the data may be inputs and weights that are to be processed by one or more layers of the neural network.

The host interface 122 receives instructions and data values from the external host/controller 120 and provides a respective set of instructions and data values to each of the super tiles 102. In some examples, the data values may be obtained from the external memory accessible by the host controller 120 and then passed to the super tiles 102 via the host interface 122. The host interface 122 is operable to use an example communication bus that is accessible by each of the super tiles 102 to pass the instructions and data values to the super tiles. In some implementations, an instruction set architecture of the system 100 is configured such that each of the super tiles 102 can receive a respective single instruction. The single instruction can include data values (e.g., inputs and weights), specific data fields and operational parameters for a workload or set of tasks in a workload.

Figure 2:
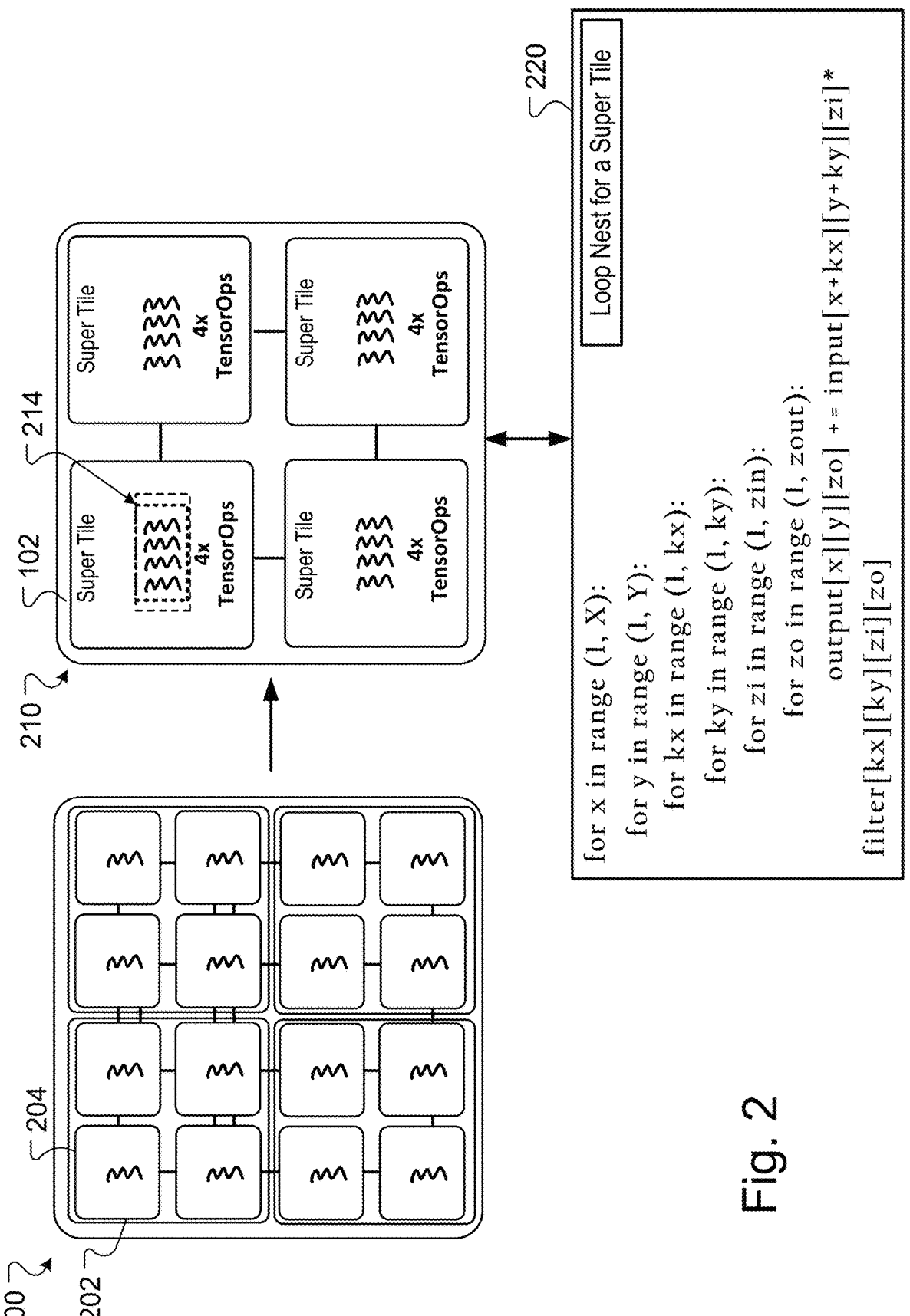
FIG. 2 is a block diagram of an example compute tile architecture of a circuit for a hardware accelerator.

In general, instructions and data values are provided to one or more devices in system 100 through a communication bus 124 (e.g., an instruction or ring bus). In some cases, the super tiles 102 receive the data and instructions for a machine-learning task via an example communication bus 124 that couples two or more super tiles in system 100. For example, communication bus 124 is configured to provide communications coupling through a bus data path that connects super tiles 102 of system 100 in an example ring format to host controller 120 via host interface 122. The ring format is depicted in the example of FIG. 2.

In some implementations, one or more instructions are received by each of the respective controllers 104 in a super tile 102 from host interface 122 at an initial time and stored in an example instruction memory of the respective controller 104 for execution by the controller 104 at a later time. The data can include inputs, activations, gain values, or combinations of each. In some examples, the data is received at the super tile 102 to be processed at a neural network layer to generate an output for the neural network layer. In such examples, processing the data at the neural network layer to generate the layer output includes generating multiple partial outputs (e.g., accumulated or preactivation values).

Each of the compute tiles 108*n* includes a respective tensor module 130 that includes a tensor operation ("TensorOp") control 132 and a TensorOp TTU 134. Each of the respective tensor modules 130 may provide functionality that is similar to, or related to, functionality provided by the DMAOp module 105 of the controller 104. For example, the TensorOp control 132 can represent control logic that is used by the controller 104 or the compute tile 108*n* to: i) manage operations for reading/accessing an input value assigned to a particular element of an input tensor from the corresponding memory location of unified memory 106 that stores the input and ii) manage associating or assigning an output value (or partial output) to a particular element of an output tensor after the output value is generated in response to one or more compute threads that are executed at the compute tile 108*n*.

The TensorOp control 130 may be executed by controller 104 or a compute thread of a compute tile 108*n* to administer traversal operations for execution by TensorOp TTU 134. For example, the TensorOp TTU 134 is operable to execute instructions for accessing sets of elements along particular dimensions of an N-dimensional, or multi-dimensional, tensor (e.g., a 2D input tensor, a 3D weight tensor, or a 4D output tensor). An example N-dimensional tensor may have multiple elements arranged across each of the N dimensions, where N is an integer that is equal to or greater than one.

The TensorOp TTU 134 determines the address of each element in the set of elements along the particular dimension of the tensor (e.g., a 2D weight tensor) such that the compute tile 108*n* (or compute thread) may access the corresponding memory or register file that stores data for the tensor to read the data representing the value of the element along the particular dimension. In some implementations, program code associated with the TensorOp TTU 134 may include one or more nested loops and the TensorOp TTU 134 may execute an instruction to access an element of a two-dimensional array/tensor variable within the nested loop according to current index variable values of the nested loop. Based on the current index variable values of the nested loop, the TensorOp TTU 134 may determine an offset value that represents an offset from a first element of the two-dimensional array variable. For example, the address of the particular element may be an address offset from another element of an N-dimensional tensor.

Each of the compute tiles 108n includes a wide memory construct 140 that includes multiple local register files 142. In some implementations, the controller 104 is configured to store a set of weights for a particular compute tile 108n in a respective register file of the particular compute tile 108n, where the particular register file 142 is local to the particular compute tile 108n. For example, the controller 104 is configured to store the individual weights of the set of weights for the layer in particular memory locations of a local register file 142 in response to passing the set of weights from the unified memory 106 to the particular compute tile 108n.

Each of the compute tiles 108n includes a respective computational unit 150 that is configured to perform arithmetic operations, such as addition and multiplication, using operands corresponding to the inputs and weight values passed to the compute tile 108n. Each of the computational units 150 can include multiple arithmetic cells 152. Each arithmetic cell 152 can be a multiply accumulate cell that is configured to perform arithmetic operations (e.g., multiplications) using the inputs and weights. For example, arithmetic operations performed by the computational unit 150 generally include multiplying inputs or activations obtained from unified memory 106 with parameters to produce sets of accumulated values. The parameters for the computations may be obtained from the wide memory construct 140 of the compute tile 108n that includes the multiple local register files 142.

Each of the compute tiles 108n includes a register array 160 and a non-linear unit 170 ("NLU 170"). The register array 160 includes multiple individual shift registers 162. Each shift register 162 can be a pipelined shift register 162. The pipelined shift registers 162 of the array 160 are used to shift output values (e.g., accumulated values or partial sums) for the layer to a non-linear unit 170 ("NLU 170"). The NLU 170 applies a non-linear activation function to the output values to generate a set of output activations for the layer. The NLU 170 interacts with write arbitration logic 110b to pass the output activations of a generated layer output to the unified memory 106 for storing in the memory 106. For example, output activations may be provided from the NLU 170 to write arbitration logic 110b via an output activation bus 113.

In some implementations, NLU 170 is operable to aggregate multiple partial sums or accumulated values into a final linear output (e.g., a vector of values) based on a control signal provided to the NLU 170 from the compute tile 108n or from by the controller 104.

FIG. 2 is a block diagram that shows example compute tile architectures of a circuit for a hardware accelerator. The block diagram in the example of FIG. 2 includes a first tile architecture 200 and second, different tile architecture 210. The first tile architecture 200 represents a tile architecture of an example prior circuit design of a special-purpose hardware circuit, whereas the second tile architecture 210 represents a new tile architecture of an improved hardware circuit based on the techniques described in this document.

The new tile architecture 210 includes multiple super tiles 102. For context, some prior approaches to performing neural network computations using the individual compute tiles 202 and compute thread 204 were limited in how the computation could be parallelized across the architecture. In contrast to these prior approaches, the new tile architecture 210 includes multiple super tiles 102 and allows for parallelization options within compute tiles 108n of a super tile 102 and across multiple super tiles 102. For example, each super tile 102 is configured to execute multiple compute threads 214, where each of the multiple threads can be executed concurrently at the super tile 102. In some cases, the concurrent execution of the multiple threads reduces or mitigates processing latency relative to prior approaches that can require serial execution of two or more compute threads when processing inputs at a layer of a neural network.

Each of the multiple compute threads 214 executed at the super tile 102 may be based on data obtained from unified memory 106 of the super tile 102, instructions received at the super tile 102, control signals 114 that are generated by the controller 104, or combinations of each. In some implementations, the multiple compute threads executed at each super tile correspond to one or more tensor operations. In the example of FIG. 2, each super tile 102 is shown as executing four separate tensor operations, however each super tile 102 can be configured to execute more or fewer tensor operations.

In some implementations, for an example computation associated with a neural network layer that uses a 2D input tensor with X, Y dimensions, the external/host controller 120 is operable to execute an input partitioning algorithm to distribute the output X, Y across a grid of super tiles 102 (e.g., new tile architecture 210). The external/host controller 120 is operable to allocate space in each of the respective unified memory 106 for each super tile 102 for storing input activations, halo pixels, and output activations. In the context of image processing workloads, halo pixels correspond to inputs that are shared between two or more compute tiles 108n. For example, a set of inputs corresponding to halo pixels may be used in convolutions in which the inputs for the edges of an image are shared.

In the example of FIG. 2, a first partitioning algorithm 220 includes a loop nest that can be used to express the net (total) work done by a super tile 102. The partitioning algorithm 220 and loop nest can be represented by a portion of program code executed by a respective TensorOp TTU 134 of different compute tiles 108n at the super tile 102. For example, variations of the partitioning algorithm 220 may be executed by each TensorOp TTU 134 across the multiple compute tiles 108n to traverse specific elements along different dimensions of an example 3D input tensor (x, y, zin) for convolving the 3D input tensor with a 2D weight (filter) tensor (kx, ky) to generate a 1D output tensor (zout). This is described in more detail below with reference to FIG. 3.

Figure 3:
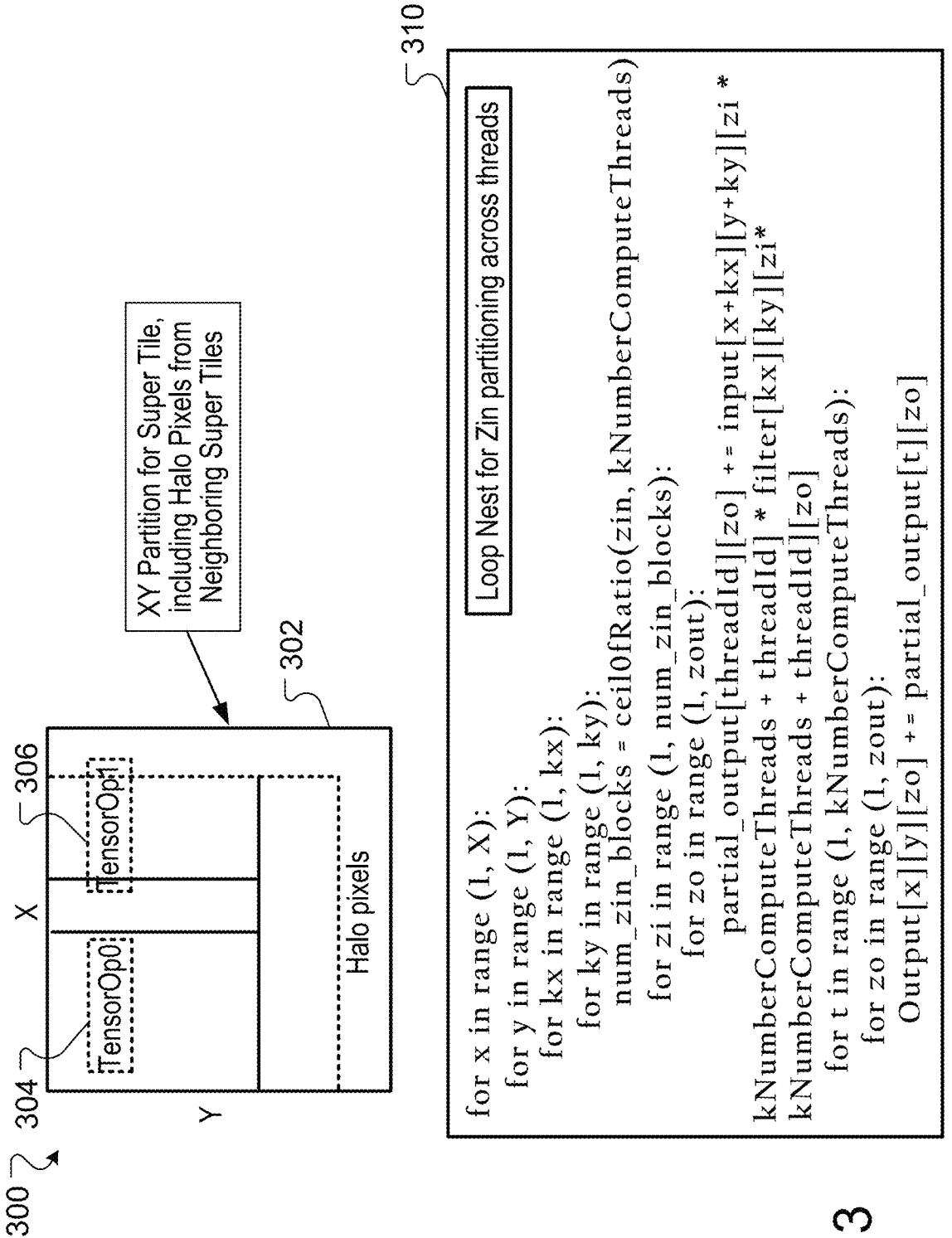
FIG. 3 illustrates an example tensor and program code for processing data corresponding to elements of the tensor.

FIG. 3 illustrates an example tensor 300 (e.g., a 3D input tensor) and a second partitioning algorithm 310 for processing data corresponding to elements of the tensor 300. Based on the new tile architecture 210 described above, the improved hardware circuit 101 described in this document provides multiple approaches and ways in which work, such as tasks and computations, can be divided amongst the kNumberComputeThreads for TensorOp threads 304 and 306 that are executed in a super tile 102 or across different super tiles 102.

For example, different combinations of approaches for dividing work amongst each of the compute tiles 108n can include: a) allocating a first set of elements for X,Y dimensions of the tensor 300 to a first compute tile 108n of a first super tile 102 and b) allocating a second set of elements for the X,Y dimensions of tensor 300, or for other dimensions of tensor 300, to a second, different compute tile 108n of the first super tile 102.

Different combinations of approaches may be also used for dividing work amongst each of the multiple super tiles 102 and the respective multiples of compute tiles 108n at each super tile 102. For example, one combination of approaches can include i) allocating different sets of elements for X,Y dimensions of the tensor 300 to at least two compute tiles 108n of a first super tile 102 and ii) allocating different sets of elements for X,Y dimensions of the tensor 300 to one or more compute tiles 108n of a second, different super tile 102.

In cases where the elements of X,Y dimensions allocated to a super tile 102 are large (e.g., exceeds a threshold size of SRAM in a compute tile 108n), the multiple compute threads can work on further 2D sub-partitions of the allocated X,Y dimensions. In some implementations, for image processing workloads, the data for the 2D sub-partitions can be processed without requiring an explicit exchange of halo pixels 302 across one or more compute threads in a super tile 102. In some implementations, the input pixels required by one or more compute threads in a super tile 102 reside initially in the unified memory 106 of the super tile 102 before being passed to a corresponding compute thread.

As discussed above, the circuit architecture and data processing techniques described in this document provide different approaches (or combinations of approaches) for optimizing how computations are parallelized across tiles, relative to prior circuit designs for performing neural network computations. In some cases the optimizations can be tied to the utilization rate of multiply accumulate cells 152 in a computational unit 150 relative to the different options for partitioning dimensions of two or more tensors across the super tiles 102 of the improved circuit architecture. As an example, some general options can include partitioning a Zin dimension of an input tensor across the 4 super tiles, or partitioning X,Y dimensions of a 2D tensor across 2 super tiles.

For example, multiple approaches may be used to parallelize computations across tiles, such that the multiply accumulate cells 152 of computational units 150 can achieve a threshold utilization rate (e.g., 70%) that is higher than a utilization rate of related cells in a prior circuit design. In some cases, the higher threshold utilization rate for each of the multiple different approaches may be higher than the utilization rate of the prior designs even though the prior designs have limited options for how computations may be parallelized across its circuit architecture.

The approach afforded by the one or more super tiles 102 allow for a portion (e.g., some or all) of an input tensor that is assigned to a super tile 102 to be further divided between and operated on by different compute tiles 108n within the super tile 102, a portion (e.g., some or all) of a parameter tensor that is assigned to a super tile 102 to be further divided between and operated on by different compute tiles 108n within the super tile 102, or both. Similarly, the approach allows for processing at a neural network layer to be split across two or more super tiles 102, e.g., the layer may be parallelized across multiple super tiles 102 such that each super tile performs part of the processing for the layer. For example, the entire layer may be partitioned across all (or some) of the super tiles 102. In general, multiple options for parallelization can be pursued using the improved circuit architecture of this approach.

Accordingly, different approaches may be used to allocate work and partition elements and dimensions of tensor 300 such that different combinations of super tiles 102 and compute threads for each super tile 102 can be used to traverse specific elements along different dimensions of an N-dimensional tensor 300 to convolve (or to perform other operations) the tensor 300 with an N-dimensional weight (filter) tensor to generate an N-dimensional output tensor. Hence, one or more N-dimensional tensors that are accessible from unified memory 106 and wide memory construct 140, in a single super tile 102, can be traversed based on memory address values processed by respective TensorOp TTUs 134 in the super tile 102.

The system 100 is configured to determine a partitioning of addresses among each compute thread of the multiple compute threads for a given super tile 102. The address partitions can be determined based on a specific approach for allocating work and partitioning elements and dimensions of tensors that are processed at system 100. In some implementations, the DMAOp control 105a is operable to determine a mapping of addresses in a partition for respective inputs in a batch of inputs to be processed through a neural network layer. For example, the respective batches of inputs may be associated with different elements of input tensor 300 and each partition of addresses may be assigned to a particular compute tile 108n or compute thread to be executed at the compute tile 108n.

FIG. 4 illustrates a table 400 that includes example instructions of an instruction set architecture for one or more super tiles.

As described above, an instruction set architecture of the system 100 can be configured such that each of the super tiles 102 receives a respective single instruction (or multiple instructions). Each of the single, or multiple, instructions can include data values (e.g., inputs and weights), specific data fields, and operational parameters for a workload or set of tasks in a workload. Hence, each of the one or more instructions that are provided to a super tile 102 via communication bus 124 can include multiple parameters or data fields. Each of the data fields can be associated with a particular operation. In some cases, one or more bits for the data field in the instruction can be set to a particular binary value that causes a specific operation to occur at a single compute tile 108 or at multiple compute tiles 108.

Referring now to table 400, a data field for an example tensor operation ("TensorOp") to be executed at a compute thread of a particular compute tile 108n indicates the target thread's TensorOp pipeline (402). In some implementations, based on the instruction received at the super tile 102, multiple data fields may be multicast concurrently to each of the compute tiles 108n for a respective compute thread to be executed at the compute tile 108n.

A data field for an example DMA operation ("NarrowToWide DMA") indicates a target thread's wide memory construct 140 that is to receive the data retrieved from the unified memory 106 (404). In some implementations, the DMA operation may be executed at the super tile 102 to move data representing a respective set of weights for a neural network layer from unified memory 106 (e.g., narrow memory) to a local register file 140 of the wide memory construct 140. For example, the set of weights is moved to the local register file 142 of the target compute thread's wide memory construct 140. In some implementations, an example operation performed by the target compute thread can include the TensorOp TTU 134 obtaining the weight value from the local register file 142, passing the weight value to a cell 152 off the compute tile 108n, and the cell 152 using the weight value as an operand for neural network computations that are executed to generate an output for the neural network layer.

A data field for another DMA operation ("RingBusConsumer DMA") indicates a target thread's wide memory construct 140 that is to receive a portion of data that was included in (or included with) an instruction provided to the super tile 102 (406). In some implementations, the data field for this DMA operation may correspond to a particular bitmap field in the instruction obtained from the communication bus 124 (e.g., a ring bus). In general, a bitmap may have a particular width defined in terms of bits.

For example, a header (e.g., a bitmap) of an instruction can indicate, to a receiving super tile 102, how the super tile 102 needs to consume the portion of data associated with the header based on a value(s) of individual bits of the bitmap field for the header. The specific way in which a super tile 102 is required to consume the portion of data may be an instruction sub-type (or a sub-type of an instruction). In some implementations, a respective controller 104 of a receiving super tile 102 examines the header bitmap of an instruction (e.g., a single instruction) and determines that a sub-type of the instruction indicates the portion of data is to be received by a wide memory construct 140 of the super tile 102. For example, the instruction sub-type may indicate a target thread's local register file 142 that is to receive a respective set of weights associated with the portion of data.

A data field for another example operation ("LoadCoefficientTables") indicates the memory of a super tile 102 for loading coefficient tables that were included in (or included with) an instruction provided to the super tile 102 (408). The data field for this load operation may correspond to a particular bitmap field in the instruction that differs from the bitmap field for the RingBusConsumer DMA operation described above. In some implementations, the coefficient tables are used by each of the target threads of a super tile 102 to perform neural network computations for an example machine-learning workload. In some cases, the coefficient tables may be stored across the respective wide memory constructs 140 that are associated with each compute thread. In other cases, the coefficient tables may be stored in some other dedicated memory of the super tile 102 that is accessible by each of the k number of compute threads.

A data field for a sync flag operation ("SyncFlag") indicates a target thread's sync flag (410). In some implementations, data fields for an example sync flag operation in an instruction is set only for sync flags that are replicated across two or more super tiles 102. A data field for a sync watcher operation ("SyncWatcher") at a super tile 102 is a Boolean field that indicates whether to a) wait on the SyncFlag corresponding to its own compute thread(s), and disregard the "thread_id" field in the instruction for the "SyncFlag" replicated instruction or b) wait on the SyncFlag corresponding to the "thread_id" field in "SyncFlag" replicated instruction (412). A data fields for an example tile fence operation "TileFence" can include a "reset_sync_flag_thread_ids" data field and a "wait_idle_thread_ids" data field (414). These data fields specify whether to reset or wait on the sync flags in the corresponding compute thread to which the tile fence operation is connected.

FIG. 5 is a flow diagram that illustrates an example process 500 for accelerating neural network computations. Process 500 can be implemented or executed using the system 100 described above. Descriptions of process 500 may reference the above-mentioned computing resources of system 100. In some implementations, steps or actions of process 500 are enabled by programmed firmware or software instructions, which are executable by one or more processors of the devices and resources described in this document.

Referring now to process 500, an example super tile 102 of system 100 receives inputs to a neural network layer and weights for the layer (502). For example, the super tile 102 can receive inputs and weights via the communication bus 124. In addition to receiving the inputs and the weights, the super tile can receive one or more instructions for performing neural network computations for a neural network layer to generate an output for the layer. The controller of the super tile stores the inputs and weights in a unified memory of the super tile (504). For example, the controller 104 stores the inputs and weights in the unified memory 106 based on the instructions received via communication bus 124.

The arbitration logic unit of the super tile passes one or more of the inputs stored in the unified memory to each compute tile of multiple compute tiles in the super tile (506). The arbitration logic unit 110 is coupled to the unified memory 106 and each compute tile 108n of the multiple compute tiles 108. In some implementations, the controller 104 is configured to determine a partitioning of addresses in the unified memory 106 for storing respective batches of inputs to be passed to a corresponding compute tile 108n of a super tile 102. For example, each partition of addresses for the unified memory 106 can be assigned to a respective compute tile 108n of the super tile.

The arbitration logic unit is configured to obtain, for a first partition of addresses, a first batch of inputs from memory locations identified by addresses in the partition of addresses; and pass the first batch of inputs to cells 152 of a first compute tile 108n, wherein the first compute tile 108n is assigned to receive each input in the first batch of inputs based on the determined partitioning of addresses in the unified memory. In some examples, a set of addresses in a partition of addresses can be for a batch of inputs that form a sample of input features. The sample of input features can include multiple sets of input features, where the sets of input features correspond to images or streams of audio data.

The arbitration logic unit passes a respective set of weights stored in the unified memory to each of the compute tiles (508). The super tile 102 executes multiple compute threads at each of the compute tiles in the super tile to perform computations to generate an output for the neural network layer (510). The super tile 102 generates the output for the neural network layer based on computations performed using one or more of the inputs and the respective set of weights at each of the compute tiles (512). In some implementations, the neural network layer is an embedding layer of a convolutional neural network and the output generated by the neural network layer is an embedding output that includes an embedding feature vector.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit for a hardware accelerator configured to implement a neural network comprising a plurality of neural network layers and to perform computations to generate an output for a neural network layer, the circuit comprising:
   a plurality of super tiles for executing computations related to the plurality of neural network layers, each super tile of the plurality of super tiles comprising:
   a plurality of compute tiles, wherein each compute tile is configured to execute a compute thread used to perform the computations to generate the output;
   a unified memory coupled to each of the plurality of compute tiles and configured to store inputs to the neural network layer and a plurality of weights for the neural network layer; and
   an arbitration logic unit coupled to the unified memory and each compute tile of the plurality of compute tiles, wherein the arbitration logic unit is configured to:
   pass one or more of the inputs stored in the unified memory to each of the compute tiles;
   pass a respective set of weights stored in the unified memory to each of the compute tiles; and
   pass, to the unified memory, the output generated for the neural network layer based on computations performed at each of the compute tiles using one or more of the inputs and the respective set of weights,
   wherein each super tile of the plurality of super tiles is configured to:
   process sub-partitions of an input tensor on two or more compute threads to generate at least a portion of the output, and
   provide from the unified memory to the two or more compute threads at least one portion of the input tensor that is shared for processing between the two or more compute threads.

2. The circuit of claim 1, comprising a respective controller for each super tile, the respective controller being configured to generate one or more control signals that are used to:
   store each of the inputs to the neural network layer in a corresponding location of the unified memory, each of the corresponding locations being identified by a respective address;
   store each weight of the plurality of weights for the neural network layer in a corresponding location of the unified memory, each of the corresponding locations being identified by a respective address; and
   cause the arbitration logic to pass one or more inputs to a compute cell of a particular compute tile and pass a respective set of weights to the particular compute tile.

3. The circuit of claim 1, wherein the controller is configured to:
   determine a partitioning of addresses in the unified memory for storing respective batches of inputs to be passed to a corresponding compute tile of a super tile, wherein each partition of addresses is assigned to a respective compute tile of the super tile.

4. The circuit of claim 3, wherein:
   a respective address in a partition of addresses corresponds to an input in a batch of inputs that form a sample of input features;
   the sample of input features comprises multiple sets of input features; and
   the sets of input features correspond to images or streams of audio data.

5. The circuit of claim 3, wherein the arbitration logic unit is configured to:
   obtain, for a first partition of addresses, a first batch of inputs from memory locations identified by addresses in the partition of addresses; and
   pass the first batch of inputs to cells of a first compute tile, wherein the first compute tile is assigned to receive each input in the first batch of inputs based on the determined partitioning of addresses in the unified memory.

6. The circuit of claim 1, wherein for each respective super tile:
   each compute tile of the plurality of compute tiles is configured to execute two or more compute threads in parallel at the compute tile; and
   each compute tile executes a compute thread to perform multiplications between one or more inputs to the neural network layer and a weight for the neural network layer to generate a partial output for the neural network layer.

7. The circuit of claim 6, wherein for each respective super tile:
   each compute tile of the plurality of compute tiles is configured to perform a portion of the computations to generate the output for the neural network layer in response to executing two or more compute threads in parallel at the compute tile; and
   in response to performing the portion of the computations, generate one or more partial outputs that are used to generate the output for the neural network layer.

8. The circuit of claim 1, wherein:
   a first portion of operations that are performed using the compute thread corresponds to a first set of tensor operations for traversing one or more dimensions of a first multi-dimensional tensor; and
   the first multi-dimensional tensor is an input tensor comprising data elements corresponding to the inputs stored in the unified memory.

9. The circuit of claim 8, wherein:
   a second portion of operations that are performed using the compute thread corresponds to a second set of tensor operations for traversing one or more dimensions of a second multi-dimensional tensor that is different than the first multi-dimensional tensor; and
   the second multi-dimensional tensor is a weight tensor comprising data elements corresponding to the plurality of weights stored in the unified memory.

10. The circuit if claim 1, wherein each super tile of the plurality of super tiles is configured to:
   partition the input tensor into sub-partitions, wherein partitioning is carried out along X-Y dimensions of the input tensor.

11. The circuit of claim 1, wherein the input tensor corresponds to an image, and wherein the at least one portion of the input tensor that is shared for processing between two or more compute threads correspond to at least one portion of the image shared for processing on the two or more compute threads.

12. The circuit of claim 1, wherein each super tile of the plurality of super tiles is configured to determine the at least one portion of the input tensor based on a size of the input tensor being greater than that which can be fully stored in a memory of the compute tile of the plurality of compute tiles.

13. A method for performing computations to generate an output for a neural network layer of a neural network comprising a plurality of neural network layers using a circuit for a hardware accelerator configured to implement the neural network, the method comprising:

receiving, at a super tile of a plurality of super tiles configured to execute computations related to the plurality of neural networks, inputs to the neural network layer and a plurality of weights for the neural network layer;

storing, in a unified memory of the super tile, the inputs to the neural network layer and the plurality of weights for the neural network layer, wherein the unified memory is coupled to each of a plurality of compute tiles included in the super tile;

passing, using an arbitration logic unit of the super tile, one or more of the inputs stored in the unified memory to each compute tile of the plurality of compute tiles in the super tile, wherein the arbitration logic unit is coupled to the unified memory and each compute tile of the plurality of compute tiles;

passing, using the arbitration logic unit of the super tile, a respective set of weights stored in the unified memory to each of the compute tiles;

executing a compute thread at each of the compute tiles in the super tile to perform the computations to generate the output for the neural network layer;

generating the output for the neural network layer based on computations performed using one or more of the inputs and the respective set of weights at each of the compute tiles;

generating at least a portion of the output based on processing of sub-partitions of an input tensor on two or more compute threads; and providing, from the unified memory to the two or more compute threads, at least one portion of the input tensor that is shared for processing between the two or more compute threads.

14. The method of claim 13, comprising:

passing, using the arbitration logic unit and to the unified memory, the output generated for the neural network layer; and passing, using a respective controller of the super tile, the output generated for the neural network layer to another super tile at the circuit.

15. The method of claim 14, comprising:

generating control signals by the respective controller of the super tile;

storing, based on the control signals, each of the inputs to the neural network layer in a corresponding location of the unified memory, each of the corresponding locations being identified by a respective address;

storing, based on the control signals, each weight of the plurality of weights for the neural network layer in a corresponding location of the unified memory, each of the corresponding locations being identified by a respective address; and causing, based on the control signals, the arbitration logic to pass one or more inputs to a compute cell of a particular compute tile and pass a respective set of weights to the particular compute tile.

16. The method of claim 15, comprising:

determining, by the controller, a partitioning of addresses in the unified memory for storing respective batches of inputs to be passed to a corresponding compute tile of a super tile, wherein each partition of addresses is assigned to a respective compute tile of the super tile.

17. The method of claim 16, wherein:

a respective address in a partition of addresses corresponds to an input in a batch of inputs that form a sample of input features;

the sample of input features comprises multiple sets of input features; and the sets of input features correspond to images or streams of audio data.

18. The method of claim 16, comprising, for a first partition of addresses:

obtaining, by the arbitration logic unit, a first batch of inputs from memory locations identified by addresses in the partition of addresses; and passing the first batch of inputs to cells of a first compute tile, wherein the first compute tile is assigned to receive each input in the first batch of inputs based on the determined partitioning of addresses in the unified memory.

19. The method of claim 13, comprising, for each respective super tile:

executing two or more compute threads in parallel at each compute tile of the plurality of compute tiles; and wherein each compute tile executes a compute thread to perform multiplications between one or more inputs to the neural network layer and a weight for the neural network layer to generate a partial output for the neural network layer.

20. The method of claim 19, comprising:

for each respective super tile:

performing, at each compute tile of the plurality of compute tiles, a portion of the computations to generate the output for the neural network layer in response to executing the two or more compute threads in parallel at the compute tile; and in response to performing the portion of the computations, generating one or more partial outputs that are used to generate the output for the neural network layer.

21. The method of claim 13, wherein:

a first portion of operations that are performed using the compute thread corresponds to a first set of tensor operations for traversing one or more dimensions of a first multi-dimensional tensor; and the first multi-dimensional tensor is an input tensor comprising data elements corresponding to the inputs stored in the unified memory.

22. The method of claim 21, wherein:

a second portion of operations that are performed using the compute thread corresponds to a second set of tensor operations for traversing one or more dimensions of a second multi-dimensional tensor that is different than the first multi-dimensional tensor; and the second multi-dimensional tensor is a weight tensor comprising data elements corresponding to the plurality of weights stored in the unified memory.

23. The method of claim 13, comprising:

partitioning the input tensor into sub-partitions of the input tensor, wherein the partitioning is carried out along X-Y dimensions of the input tensor.

24. The method of claim 13, wherein the input tensor corresponds to an image, and wherein the at least one portion of the input tensor that is shared for processing between two or more compute threads correspond to at least one portion of the image shared for processing on the two or more compute threads.

25. The method of claim 13, wherein the input tensor corresponds to an image, and wherein the at least one portion of the input tensor that is shared for processing between two or more compute threads correspond to at least one portion of the image shared for processing on the two or more compute threads.

26. A system-on-chip comprising:

a circuit for a hardware accelerator configured to implement a neural network comprising a plurality of neural network layers and to perform computations to generate an output for a neural network layer;

a host controller configured to access memory that is external to the circuit for the hardware accelerator, wherein the memory is configured to store data for processing at the neural network layer;

a host interface configured to exchange data communications between the circuit for the hardware accelerator and the host controller; and a plurality of super tiles, for executing computations related to the plurality of neural network layers, disposed in the circuit, each super tile of the plurality of super tiles comprising:

a plurality of compute tiles, where in each compute tile is configured to execute a compute thread used to perform the computations to generate the output;

a unified memory coupled to each of the plurality of compute tiles and configured to store inputs to the neural network layer and a plurality of weights for the neural network layer, wherein the inputs and the plurality of weights correspond to the data stored in the memory accessible by the host controller; and an arbitration logic unit coupled to the unified memory and each compute tile of the plurality of compute tiles, wherein the arbitration logic unit is configured to:

pass one or more of the inputs stored in the unified memory to each of the compute tiles;

pass a respective set of weights stored in the unified memory to each of the compute tiles;

pass, to the unified memory, the output generated for the neural network layer based on computations performed at each of the compute tiles using one or more of the inputs and the respective set of weights, wherein each super tile of the plurality of super tiles is configured to:

process sub-partitions of an input tensor on two or more compute threads to generate at least a portion of the output, and provide from the unified memory to the two or more compute threads at least one portion of the input tensor that is shared for processing between the two or more compute threads.

* * * * *